United States Patent
Sakasegawa et al.

(10) Patent No.: US 8,800,593 B2
(45) Date of Patent: Aug. 12, 2014

(54) FLOW CONTROLLER

(75) Inventors: Takeshi Sakasegawa, Kashiwa (JP); Yuta Oshima, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 92 days.

(21) Appl. No.: 13/502,757

(22) PCT Filed: Sep. 16, 2010

(86) PCT No.: PCT/JP2010/066034
§ 371 (c)(1),
(2), (4) Date: Apr. 19, 2012

(87) PCT Pub. No.: WO2011/048896
PCT Pub. Date: Apr. 28, 2011

(65) Prior Publication Data
US 2012/0204974 A1    Aug. 16, 2012

(30) Foreign Application Priority Data
Oct. 20, 2009    (JP) .................................. 2009-241343

(51) Int. Cl.
*F16K 31/02*    (2006.01)

(52) U.S. Cl.
USPC ..................... 137/487.5; 137/486; 137/492.5; 251/61.3; 251/30.01; 251/282

(58) Field of Classification Search
USPC ........... 137/487.5, 486, 492, 492.5; 251/61.3, 251/30.01, 282
See application file for complete search history.

(56) References Cited

U.S. PATENT DOCUMENTS

| | | | |
|---|---|---|---|
| 3,103,949 A * | 9/1963 | Fiorentini | 137/492 |
| 4,722,360 A | 2/1988 | Odajima et al. | |
| 5,109,692 A * | 5/1992 | Fitzgerald | 73/168 |
| 5,632,465 A * | 5/1997 | Cordua | 251/46 |

(Continued)

FOREIGN PATENT DOCUMENTS

| DE | 10 2007 009 869 A1 | 9/2007 |
|---|---|---|
| JP | 61 173319 | 8/1986 |

(Continued)

OTHER PUBLICATIONS

Office Action issued Sep. 11, 2012 in Japanese Patent Application No. 2009-241343 with partial English translation.

(Continued)

*Primary Examiner* — Eric Keasel
*Assistant Examiner* — Minh Le
(74) *Attorney, Agent, or Firm* — Oblon, Spivak, McClelland, Maier & Neustadt, L.L.P.

(57) ABSTRACT

A flow controller includes a flow detection unit that includes a detection unit for detecting the flow rate of a fluid; and a flow control unit that is coupled to the flow detection unit and that is capable of adjusting the flow rate of the fluid. The detection sensor constituting the detection unit includes a thermal flow sensor using MEMS technology, and the flow rate of the fluid that has been detected by the detection sensor is output to a control unit. In addition, in the flow control unit, the supply state of air to a supply room is switched by each of a supply-use solenoid valve and an exhaust-use solenoid valve, and on the basis of the supply state of the air, a control valve opens and closes.

9 Claims, 3 Drawing Sheets

(56) References Cited

U.S. PATENT DOCUMENTS

| | | | |
|---|---|---|---|
| 5,865,205 A * | 2/1999 | Wilmer | 137/2 |
| 5,975,126 A * | 11/1999 | Bump et al. | 137/487.5 |
| 6,305,401 B1 * | 10/2001 | Uehara et al. | 137/102 |
| 6,354,319 B1 * | 3/2002 | Mooney | 137/14 |
| 6,389,364 B1 * | 5/2002 | Vyers | 702/45 |
| 6,457,696 B1 * | 10/2002 | Hirota | 251/30.02 |
| 6,584,999 B2 * | 7/2003 | Inayama et al. | 137/487.5 |
| 6,779,541 B2 * | 8/2004 | Inayama et al. | 137/102 |
| 6,830,229 B2 * | 12/2004 | Wetzel et al. | 251/30.02 |
| 7,140,384 B2 * | 11/2006 | Kang et al. | 137/487.5 |
| 7,651,263 B2 * | 1/2010 | Zolock et al. | 374/110 |
| 7,905,139 B2 * | 3/2011 | Lull | 73/202.5 |
| 8,160,833 B2 * | 4/2012 | Smirnov et al. | 702/100 |
| 2009/0283155 A1 * | 11/2009 | Yoshino et al. | 137/487.5 |
| 2010/0051110 A1 * | 3/2010 | Ocondi | 137/2 |
| 2010/0163119 A1 * | 7/2010 | Isobe et al. | 137/486 |
| 2010/0324743 A1 * | 12/2010 | Shajii et al. | 700/282 |
| 2011/0125424 A1 * | 5/2011 | Han et al. | 702/47 |
| 2011/0247696 A1 * | 10/2011 | Zolock et al. | 137/2 |
| 2012/0090702 A1 * | 4/2012 | Shalev | 137/486 |

FOREIGN PATENT DOCUMENTS

| | | |
|---|---|---|
| JP | 63 20605 | 1/1988 |
| JP | 63-316110 A | 12/1988 |
| JP | 8-185229 A | 7/1996 |
| JP | 9 101827 | 4/1997 |
| JP | 2784154 | 8/1998 |
| JP | 2002 181594 | 6/2002 |

OTHER PUBLICATIONS

International Search Report Issued Oct. 12, 2010 in PCT/JP10/66034 Filed Sep. 16, 2010.

Office Action dated May 6, 2014 issued in corresponding German Patent Application No. 112010004226.8, filed Jan. 3, 2013.

* cited by examiner

FLOW CONTROLLER

TECHNICAL FIELD

The present invention relates to a flow controller, which is capable of detecting the flow rate of a fluid that flows through a passage and of controlling the flow rate.

BACKGROUND ART

Heretofore, as disclosed in the specification of Japanese Patent No. 2784154, a flow controller is constituted from a flow rate detector for measuring the flow rate of a fluid, and a proportional valve disposed in parallel with the flow rate detector. A main flow passage extends through the interior of the flow rate detector. On the inner wall of the main flow passage, a conduit inlet and a conduit outlet are opened, which are connected respectively to a conduit. A pair of heat-sensitive coils are wound on the conduit, which are connected to an amplifier. In addition, the flow rate of the fluid that flows through the conduit is estimated using a difference in resistance, which occurs due to a temperature difference generated between the heat-sensitive coils.

Further, in the proportional valve, a diaphragm is disposed in the center of a hollow proportional valve body, the periphery of the diaphragm being fixed to the proportional valve body. A valve stem, which interconnects the diaphragm and the valve body, is connected to the center of the diaphragm. In addition, a return spring is disposed on an upper portion of the diaphragm. The diaphragm is normally urged downward by the return spring, and together therewith, air pressure is supplied into a chamber beneath the diaphragm under a switching action of a supply solenoid valve, or alternatively, the air pressure inside the chamber is discharged to the exterior under a switching action of an exhaust solenoid valve.

The diaphragm is displaced upwardly in opposition to the elastic force of the return spring, whereby the valve body separates away from the valve seat enabling the fluid to flow therethrough. At this time, the flow rate of the fluid is detected by the flow rate detector, and based on the detection result detected by the flow rate detector, the flow rate is feedback controlled by operating the supply solenoid valve and the exhaust solenoid valve.

In general, with the aforementioned flow controller, because the structure thereof is complex and the apparatus is comparatively large in scale, recently, there have been demands for a structure that is simplified and smaller in scale.

On the other hand, with the conventional technique according to Japanese Patent No. 2784154, in the aforementioned flow rate detector, although a capillary heating system is adopted in which the heat-sensitive coils are wound with respect to a thin metal conduit, because a time lag is generated in the conduit when heat is transferred from the heat-sensitive coils, the response time is delayed. Furthermore, when the flow rate detector is assembled, since work is required to wind the heat-sensitive coils on the conduit and for welding the conduit with respect to the body, the assembly operation is complex, along with concerns over an increase in manufacturing costs.

Further, the proportional valve is constructed to carry out opening and closing of the valve body by a diaphragm, and in order for the proportional valve to be placed in a valve closed state in which the valve body is seated on the valve seat, a large elastic force is required for the return spring. As a result, there is a necessity for the return spring to be made large in scale, leading to a problem in that the product size is increased. Further, in the case that the elastic force of the return spring is large, the minimum operating pressure must also be large, and thus there is a concern that the proportional valve cannot be operated at low pressures.

Further, for example, in the case that a solenoid valve, which is operated by a control signal, is disposed in the proportional valve in place of a diaphragm operated by air pressure, and a structure is provided therein for opening and closing the valve body by operating the solenoid valve, then power consumption is increased, and together therewith, cases can be expected in which accurate detection results cannot be obtained, as a result of heat generated at the solenoid section of the solenoid valve being transferred to the flow rate detector.

SUMMARY OF INVENTION

A general object of the present invention is to provide a flow controller, which can be made smaller in scale and simplified in structure, and which can reduce power consumption and be operated with low pressures when the flow rate of a fluid is controlled, together with enabling the flow rate to be controlled rapidly.

The present invention is characterized by a flow controller comprising a body having a first passage disposed on an upstream side through which a fluid flows, a second passage disposed on a downstream side with respect to the first passage, and a throttling section disposed between the first passage and the second passage, a flow rate detector disposed on the body and which has a detection unit which is capable of detecting the flow rate of the fluid that flows from the first passage to the second passage, a flow rate controller for controlling a flow rate of the fluid through the valve body and which is disposed in parallel with the flow rate detector, the flow rate controller including a diaphragm assembly which is displaced by supply of pilot air, a valve body connected to the diaphragm assembly through a stem, and a spring that urges the valve body in a direction to be seated on a valve seat formed in the body, wherein the detection unit is constituted by a MEMS sensor, the flow rate controller further comprising a balancing structure for balancing a pressing force applied from the diaphragm assembly with respect to the valve body with a pressing force applied from the spring with respect to the valve body.

According to the present invention, by providing the flow rate detection unit including the detection unit, which is capable of detecting the flow rate of the fluid, in the body, which is equipped with the first and second passages and the throttling section through which the fluid flows, and by using the MEMS sensor in the detection unit, the detection time when the flow rate of the fluid is detected can be shortened, and the device can be made smaller in scale. Together therewith, since the device can be operated with low current, power consumption can be reduced. Further, because a balancing structure is provided for balancing a pressing force applied from the diaphragm assembly with respect to the valve body with a pressing force applied from the spring with respect to the valve body, the valve body can easily be operated by low-pressure pilot air. Together therewith, the spring can be set with a small elastic force, whereby the valve body can be operated rapidly and the flow rate control unit can be miniaturized, along with enabling the flow controller to be made smaller in scale.

DESCRIPTION OF EMBODIMENTS

A preferred embodiment of a flow controller according to the present invention will be described below with reference to the accompanying drawings.

Figure 1:
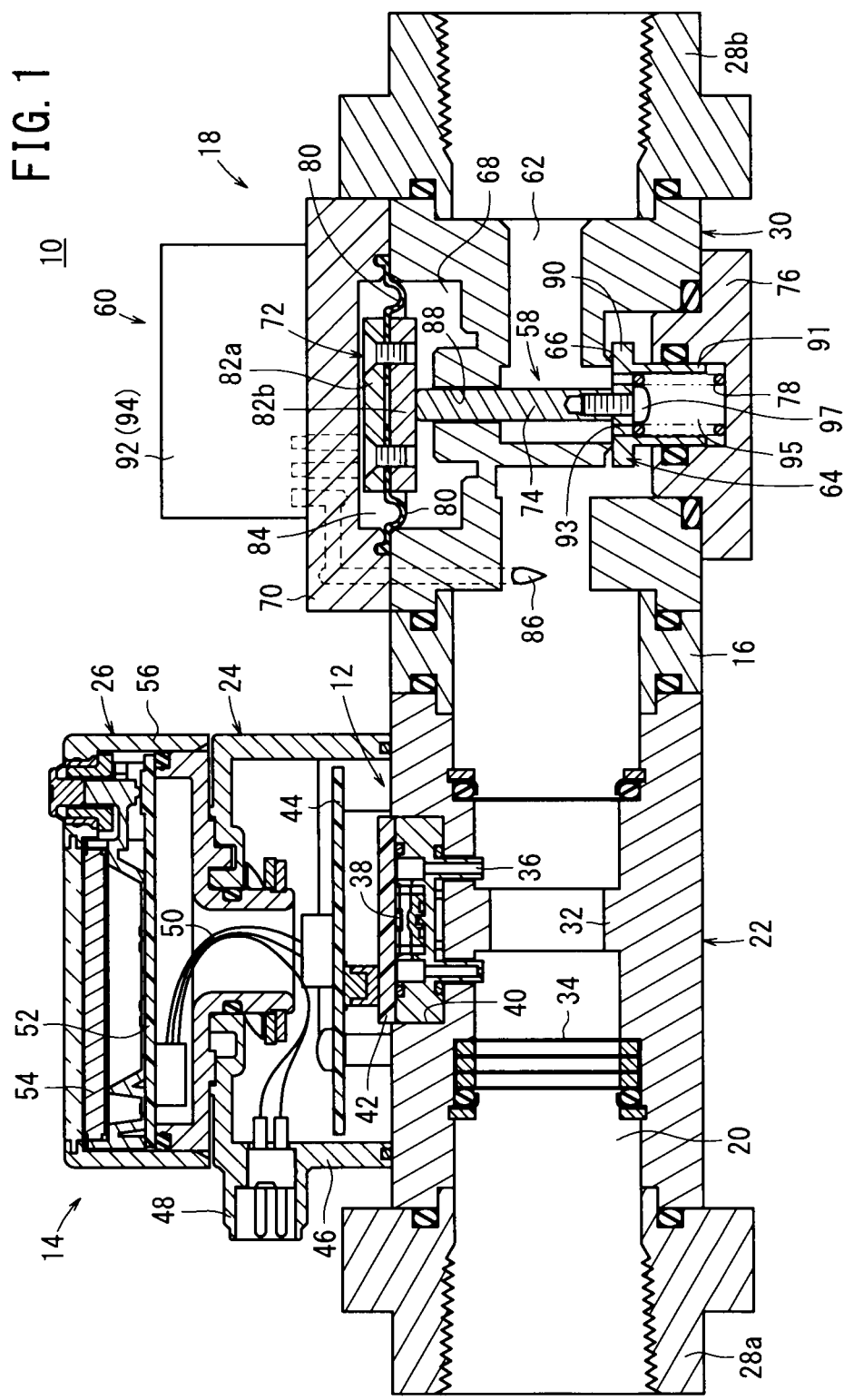
FIG. 1 is an overall configuration diagram of a flow controller according to an embodiment of the present invention.

In FIG. 1, reference numeral 10 indicates a flow controller according to an embodiment of the present invention.

Figure 2:
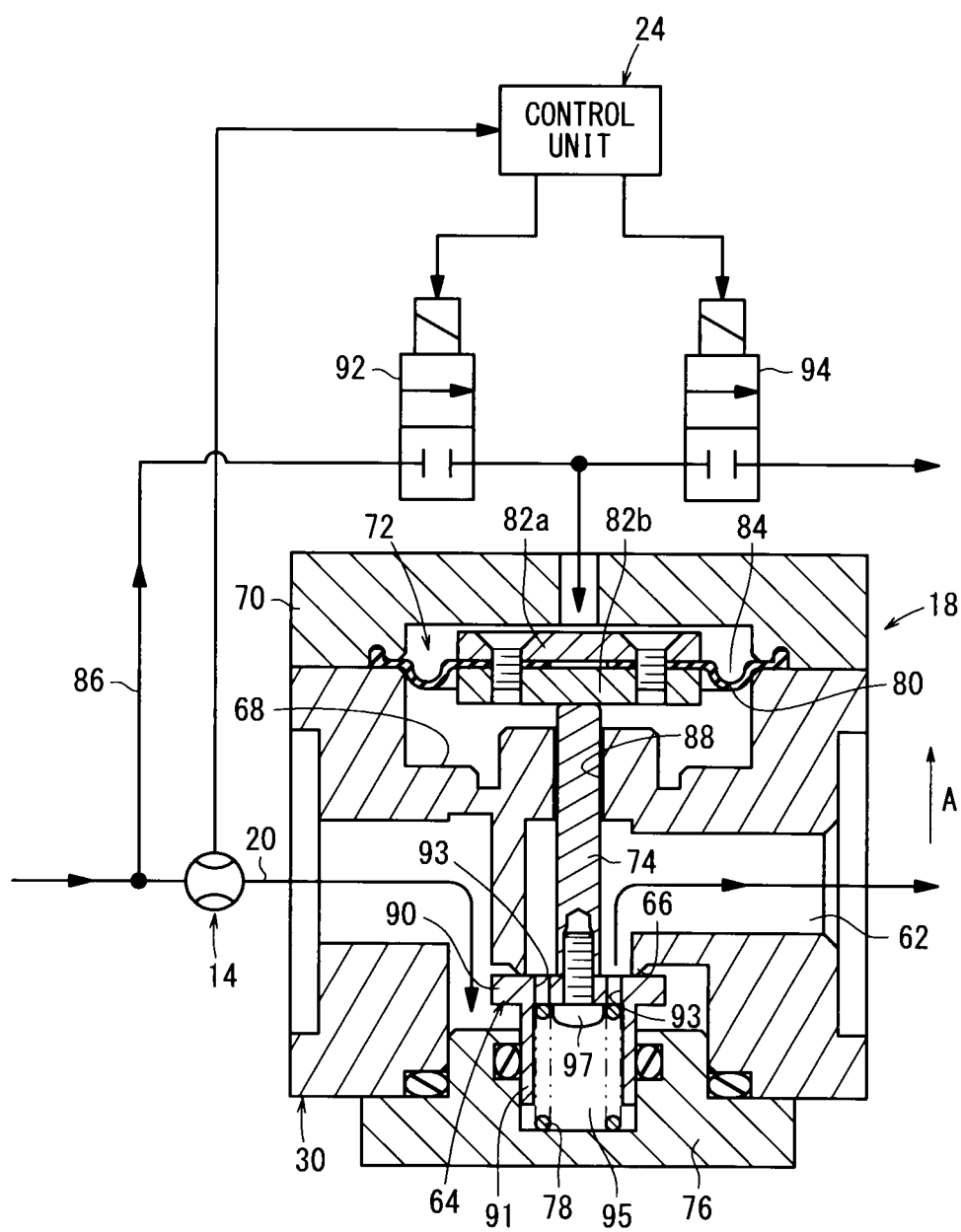
FIG. 2 is an enlarged cross sectional view of a flow rate control unit of FIG. 1.
Figure 3:
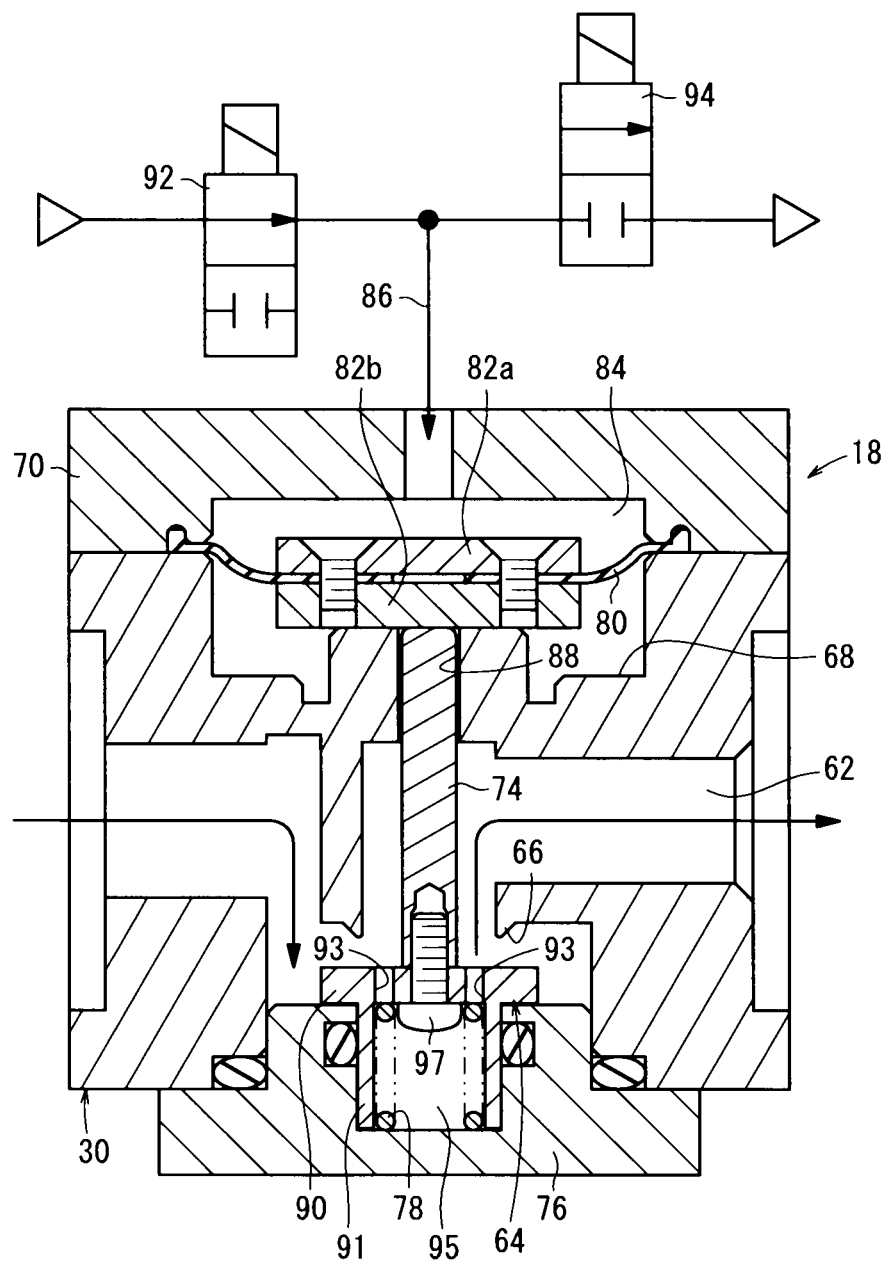
FIG. 3 is a schematic structural diagram of a flow rate control system including the flow controller of FIG. 1.

As shown in FIGS. 1 through 3, the flow controller 10 includes a flow rate detection unit (flow rate detector) 14 equipped with a detection unit 12 for detecting a flow rate of a fluid, and a flow rate control unit (flow rate controller) 18 connected through an adapter 16 to the flow rate detection unit 14 and which is capable of adjusting the flow rate of the fluid. A fluid (e.g., air), which is supplied from a non-illustrated fluid supply source, after having been supplied from the side of the flow rate detection unit 14, flows to the flow rate control unit 18. Further, the flow rate detection unit 14 and the flow rate control unit 18 may be connected to each other directly, without intervention of the aforementioned adapter 16.

The flow rate detection unit 14 is made up from a first body 22 having a first passage 20 through which a fluid flows, the detection unit 12 disposed to confront the first passage 20 for detecting the flow rate of the fluid, a control unit 24 disposed on an upper part of the detection unit 12 and to which a detection result detected by the detection unit 12 is output, and a display unit 26 which is capable of displaying a result calculated by the control unit 24.

The first body 22 includes the first passage 20, which penetrates in a horizontal direction through the interior thereof. A tube (not shown) to which a fluid is supplied through a fitting member 28a is connected to one end of the first body 22, and to the other end thereof, a second body 30 constituting the flow rate control unit 18 is connected while sandwiching the adapter 16 therebetween. In addition, the fluid, which is supplied from the non-illustrated tube, after having flowed through the first passage 20 of the first body 22, passes through the interior of the adapter 16, and is supplied to the flow rate control unit 18.

A throttling section 32, which is reduced in diameter in a radial inward direction, is included in the first passage 20 in the vicinity of the center thereof along the longitudinal direction. The detection unit 12 is disposed on an upper portion of the first passage 20 so as to face toward the throttling section 32. Further, in the first passage 20, on an upstream side of the throttling section 32, or more specifically, at a position on one end side of the first passage 20 with respect to the throttling section 32, a plurality of flow rectifiers 34 are disposed for rectifying the flow of the fluid (see FIG. 1). The flow rectifiers 34 are made up from plates having holes therein through which the fluid can flow, the flow rectifiers 34 being disposed in parallel along the flow direction of the fluid, such that fluid that passes through the holes is rectified, and dust or the like contained within the fluid is removed.

The detection unit 12 comprises a detection passage 36 that communicates between an upstream side and a downstream side of the throttling section 32 in the first passage 20 thereby to bypass the first passage 20, and a detection sensor 38, which is disposed to face toward the detection passage 36. The detection sensor 38 is disposed in a cavity 40 provided on an outer circumferential surface of the first body 22.

The detection sensor 38 comprises a thermal flow sensor using MEMS (Micro Electro Mechanical Systems) technology, and comprises a pair of temperature measuring elements arranged about a heat generating element, wherein the flow rate of the fluid that flows through the detection passage 36 is detected based on a resistance value change in the temperature measuring elements. In addition, the flow rate of the fluid is output to the control unit 24 as a detection signal through a sensor circuit board 42 that is connected to the detection sensor 38.

The control unit 24 is installed on an upper part of the first body 22 facing the detection unit 12, and a controller circuit board 44, which is connected electrically with respect to the detection sensor 38, is accommodated in the interior of a first casing 46. A connector connection unit 48, which is capable of being connected to a connector from the exterior, is disposed on a side portion of the first casing 46.

The display unit 26 comprises a display circuit board 52 mounted on an upper part of the first casing 46 constituting the control unit 24, and which is connected electrically through lead wires 50 with respect to the controller circuit board 44, and a display 54, which is capable of displaying the flow rate of the fluid detected by the detection unit 12 or the like. The display circuit board 52 and the display 54 are accommodated in the interior of a second casing 56, the display 54 being disposed to enable visual observation thereof from the exterior. The display circuit board 52 also is connected electrically through lead wires 50 to the connector connection unit 48.

The flow rate control unit 18 includes the second body 30, which is connected to the flow rate detection unit 14, a control valve 58 disposed in the interior of the second body 30 and which is capable of adjusting the flow rate of the fluid that flows through the interior of the second body 30, and a switching unit 60 disposed on an upper part of the second body 30 for switching between open and closed states of the control valve 58.

The second body 30 is connected with the first body 22 substantially along a straight line, and is formed with a second passage 62 in the interior thereof through which the fluid flows. Midway along the second passage 62, a valve seat 66 is formed, on which a valve body 64 that constitutes the later-described control valve 58 can be seated. The valve seat 66 is formed with an annular shape facing downwardly. Further, a non-illustrated tube or the like is connected through a fitting member 28b to the other end of the second body 30.

The control valve 58 comprises a cavity 68, which is formed on an upper part of the second body 30, a diaphragm assembly 72 disposed in a space formed between the cavity 68 and a cover member 70 that covers the cavity 68, a stem 74 connected to the diaphragm assembly 72 and which is disposed for displacement along a direction perpendicular to the second passage 62, the valve body 64 which is connected to a lower end of the stem 74, and a spring 78 interposed between the valve body 64 and a plug 76 that is connected to a lower part of the second body 30.

The diaphragm assembly 72 is made up from a flexible thin-film diaphragm 80 that is sandwiched between the second body 30 and the cover member 70, and retaining members 82a, 82b that sandwich an upper surface side and a lower surface side in a center portion of the diaphragm 80. Additionally, a space, which is defined between the diaphragm assembly 72 and the cover member 70, creates a supply chamber 84 into which pilot air is supplied under a switching action of a supply solenoid valve (supply valve) 92 that constitutes a switching unit (switching valve) 60. The supply chamber 84 communicates with a supply passage 86, which is connected to an upstream side from a location where the control valve 58 is disposed in the second passage 62, whereby fluid that passes through the supply passage 86 is supplied from the second passage 62 into the supply chamber 84.

The stem 74 is connected so as to extend downward from the center of the retaining members 82a, 82b and is guided for displacement along a guide hole 88 formed in the second body 30. The guide hole 88 is formed to penetrate through the center of the valve seat 66.

The valve body 64 is formed with a substantially U-shape in cross section having a seat part 90 formed on an upper part thereof, and a tubular part 91 that extends downward perpendicularly with respect to the seat part 90. The stem 74 is connected by a bolt 97 to the center of the seat part 90, and the spring 78 is inserted in the interior of the tubular part 91. Further, plural communication holes 93 are formed in the seat part 90, which penetrate in the axial direction of the valve body 64 to a radial inner side with respect to the tubular part 91, such that the upper surface side and the lower surface side of the seat part 90 are kept continuously in communication through the communication holes 93.

In addition, the valve body 64 is normally pressed upwardly by an elastic force of the spring 78, so that the valve body 64 is seated by the pressing force onto the valve seat 66 that is formed above the valve body 64. Thus, communication between the upstream side and the downstream side of the second passage 62 is blocked centrally about the control valve 58. At this time, air in the second passage 62 on the downstream side with respect to the valve body 64 is introduced through the communication holes 93 into the interior of the space 95 in which the spring 78 is disposed, and therefore, the valve body 64 is placed in a balanced state, in which substantially the same pressure is imposed equally in upward and downward directions with respect to the upper surface side and the lower surface side of the seat part 90.

Consequently, for example, when the valve body 64 is separated from the valve seat 66 thereby to be brought into a valve open state, because a pressing force may be applied with respect to the valve body 64, which need only be sufficient to overcome the elastic force of the spring 78, the valve body 64 can be actuated rapidly and at low pressure.

The switching unit 60 comprises the supply solenoid valve 92 for supplying fluid that passes through the second passage 62 with respect to the supply chamber 84, and an exhaust solenoid valve (exhaust valve) 94 for discharging to the exterior fluid that has been supplied to the supply chamber 84. The supply solenoid valve 92 and the exhaust solenoid valve 94 are excited based on control signals output from the control unit 24 of the flow rate detection unit 14, whereby switching between supply and exhaust states of the fluid is carried out with respect to the supply chamber 84.

More specifically, by operating the supply solenoid valve 92, fluid that has flowed into the supply passage 86 from the second passage 62 is supplied into the supply chamber 84, whereby the diaphragm assembly 72 is pressed and displaced downward by the fluid. As a result, the valve body 64 is displaced downward through the stem 74 in opposition to the elastic force of the spring 78, whereby the valve body 64 separates from the valve seat 66 and communication with the second passage 62 is established. Conversely, by operating the exhaust solenoid valve 94, the fluid in the supply chamber 84 is discharged to the exterior, whereby the downward pressing force with respect to the diaphragm assembly 72 is dissipated. Consequently, the valve body 64 is pressed upwardly (in a direction indicated by arrow A) by the elastic force of the spring 78, and by seating of the valve body 64 on the valve seat 66, the state of communication with the second passage 62 is blocked.

Further, the control signals output to the aforementioned supply solenoid valve 92 and exhaust solenoid valve 94, for example, are PWM (pulse width modulated) signals or PFM (pulse frequency modulated) signals, whereby the supply solenoid valve 92 and the exhaust solenoid valve 94 are operated intermittently based on such control signals. More specifically, in accordance with a PWM control or a PFM control, because the supply solenoid valve 92 and the exhaust solenoid valve 94 are not operated continuously, they can be controlled such that the amount of heat emitted therefrom is suppressed.

Furthermore, the supply solenoid valve 92 and the exhaust solenoid valve 94 are constituted by two-way valves, which are capable of being switched electrically by respective electric signals, such that by inputting the above control signals thereto, the supply chamber 84 is placed in a state of communication with the supply passage 86, or alternatively, with the exterior.

The supply solenoid valve 92 and the exhaust solenoid valve 94 are not limited to being constituted from two of two-way valves. For example, in place of two of two-way valves, the supply solenoid valve 92 and the exhaust solenoid valve 94 may be constituted by a single three-way valve or a single five-way valve.

The flow controller 10 according to the present invention is constructed basically as described above. Next, operations and advantages of the flow controller 10 will be described. In the following explanations, as shown in FIGS. 1 and 2, a valve closed state will be described as an initial condition in which, without any control signals being output from the control unit 24 with respect to the supply solenoid valve 92 and the exhaust solenoid valve 94, the valve body 64 is seated on the valve seat 66 by the elastic force of the spring 78, and the state of communication with the second passage 62 is blocked.

At first, fluid (e.g., air) is supplied through a non-illustrated tube with respect to the first passage 20 of the flow rate detection unit 14, and the fluid passes through the holes of the plural flow rectifiers 34 in the first passage 20 and flows downstream therefrom. At this time, dust contained within the fluid is captured and removed by the plural flow rectifiers 34 in the first passage 20, the flow of the fluid is rectified, and the fluid flows to the downstream side.

Simultaneously therewith, a control signal is output from the control unit 24 with respect to the supply solenoid valve 92, and by exciting the supply solenoid valve 92, the supply passage 86 is placed in a state of communication with the second passage 62. Consequently, a portion of the fluid that was introduced to the second passage 62 is supplied into the supply chamber 84 as pilot air, and the diaphragm assembly 72 together with the stem 74 is pressed downward by the pilot air. In addition, the valve body 64 is displaced downward in opposition to the elastic force of the spring 78, and as a result of the valve body 64 separating from the valve seat 66 thereby to bring the first passage 20 and the second passage 62 into a communication state, fluid flows from the first passage 20 of the flow rate detection unit 14 into the second passage 62 of the flow rate control unit 18.

At this time, because in the valve closed state, the valve body 64 is in a balanced condition, in which air on the downstream side of the valve body 64 presses the upper surface side and the lower surface side of the seat part 90 respectively in equilibrium, even if the pilot air supplied to the supply chamber 84 is low in pressure, the diaphragm assembly 72 can be displaced downward instantly to produce the valve open state.

In addition, in the flow rate detection unit 14, the fluid passes through the reduced-diameter throttling section 32 and flows to the second passage 62 of the flow rate control unit 18. Together therewith, a portion of the fluid flows from the upstream side of the throttling section 32 into the detection passage 36, and from the downstream side of the throttling section 32 again into the first passage 20 and merges with the flow therein. As for the fluid introduced into the detection passage 36, the flow rate of the fluid is detected by the detection sensor 38 based on a difference in resistance generated by the pair of temperature measuring elements, and the detection result is output as a detection signal to the controller circuit board 44 via the sensor circuit board 42. In addition, the flow rate of the fluid, for example, is output to and displayed on the display 54 of the display unit 26.

Further, the flow rate detected by the detection unit 12 is compared with a set flow rate set beforehand in the control unit 24, and it is judged whether or not the flow rate is equal to the set flow rate. For example, in the case that the flow rate of the fluid is less than the set flow rate, then since it is necessary to increase the flow rate, a control signal is output from the control unit 24 with respect to the supply solenoid valve 92, and the supplied amount of fluid supplied to the supply chamber 84 is increased. As a result, the diaphragm assembly 72 is displaced further downward to increase the flow rate of fluid that flows through the second passage 62, whereby the flow rate of the fluid is controlled to attain the set flow rate.

On the other hand, in the case that the flow rate of the fluid is greater than the set flow rate, a control is performed to decrease the amount by which the control valve is opened in order to decrease the flow rate. In this case, control signals are output from the control unit 24 respectively and individually with respect to the supply solenoid valve 92 and the exhaust solenoid valve 94. In addition, the supply solenoid valve 92 is placed in an OFF state, whereby supply of fluid to the supply chamber 84 is stopped by switching the supply solenoid valve 92, and together therewith, by switching the exhaust solenoid valve 94, fluid in the supply chamber 84 is discharged to the exterior. As a result, the pressing force that presses the diaphragm assembly 72 downward is dissipated, whereby the valve body 64, the stem 74, and the diaphragm assembly 72 are displaced upwardly by the elastic force of the spring 78, and the flow rate of the fluid that flows between the valve body 64 and the valve seat 66 is throttled and decreased.

As a result, the flow rate of the fluid that flows through the second passage 62 is reduced, and the flow rate of the fluid is controlled to obtain a set flow rate.

In the above-described embodiment, although a structure is provided in which the supply passage 86 for introducing fluid into the supply chamber 84 is disposed on a downstream side of the flow rate detection unit 14, the invention is not limited by this feature. For example, the supply passage 86 may be disposed on the upstream side of the flow rate detection unit 14, whereby fluid that flows through the first passage 20 is supplied to the supply chamber 84. In this case, since the fluid that serves as pilot air for operating the flow rate control unit 18 is not detected as a flow rate in the flow rate detection unit 14, the flow rate of the fluid that flows on the downstream side of the flow rate control unit 18, and the flow rate that is detected by the flow rate detection unit 14 can match each other with high accuracy.

Further, the flow rate control unit 18 is not limited to being disposed on the downstream side of the flow rate detection unit 14, and may be disposed on the upstream side of the flow rate detection unit 14.

Moreover, instead of disposing the supply solenoid valve 92 and the exhaust solenoid valve 94 that make up the switching unit 60 directly with respect to the second body 30 of the flow rate control unit 18, they may be arranged at positions separated from the flow rate control unit 18, and the flow rate control unit 18 may be operated remotely to control the fluid flow rate.

In the foregoing manner, according to the present embodiment, in the detection unit 12 of the flow rate detection unit 14, because a thermal flow sensor that uses MEMS technology is employed, when the flow rate of the fluid is detected, the detection time can be shortened, and since the detection unit 12 can be operated with low current, power consumption can be reduced.

Further, in the flow rate control unit 18, which is capable of controlling the fluid flow rate, the control valve 58 is displaced under a supply action of a fluid, and because a balanced structure is provided in which the pressing force applied from the diaphragm assembly 72 with respect to the valve body 64 and the pressing force applied from the spring 78 with respect to the valve body 64 are equalized, when the diaphragm assembly 72 is pressed, the diaphragm assembly 72 can be displaced with pilot air having a low pressure, and the valve body 64 can be operated rapidly. Thus, a flow controller 10 capable of being operated at low pressures can be provided. Furthermore, because a small spring 78 can be set therein, the flow rate control unit 18 including the aforementioned spring 78 can be made smaller in scale, along with facilitating a reduction in scale of the flow controller 10 as a whole.

Further, in the aforementioned flow controller, for example, in the case that a large flow rate control on the order of 1000 liters/minute is carried out, it becomes necessary for the effective area of the second passage 62 to be increased corresponding to the large flow rate passing therethrough, accompanied by setting the valve body to have a large piston area, and together therewith, a spring must be employed having a large elastic force in order to overcome the pressing force applied from the fluid and to seat the valve body on the valve seat. In this case, an increase in size of the spring is brought about, and due to the large elastic force of the spring, the operating force when the valve body is displaced in opposition to the elastic force must be large, and it is difficult to operate the valve body at low pressures.

In contrast thereto, with the configuration of the present invention, the control valve 58 with the aforementioned balanced structure is adopted, and since respective pressing forces normally are applied equally to the upper surface side and the lower surface side of the valve body 64, even in the case that the effective area of the second passage 62 and the piston area of the valve body 64 are increased such that a large flow rate control is carried out, it is unnecessary for the spring 78 to be enlarged in size, and operations can be performed rapidly and at low pressures.

More specifically, compared to a flow controller that includes a flow rate control unit without such a balanced structure, in the present flow controller, for example, a large flow rate control of 1000 liters/minute or greater can be performed.

Still further, because the control signals, which are output to the supply solenoid valve 92 and the exhaust solenoid valve 94 that make up the switching unit 60, are PWM (pulse width modulated) signals or PFM (pulse frequency modulated) signals, and the supply solenoid valve 92 and the exhaust solenoid valve 94 are operated intermittently based on such control signals, compared to a case of operating the supply solenoid valve 92 and the exhaust solenoid valve 94 continuously, the amount of heat generated thereby can be suppressed, and deterioration in detection accuracy due to heat emitted from the switching unit 60 being transferred to the flow rate detection unit 14 can be avoided. In addition, power consumption in the switching unit 60 can be reduced.

Furthermore, in the flow rate control unit 18, because there is no need to operate the supply solenoid valve 92 and the exhaust solenoid valve 94 when the flow rate of the fluid is stable, the durability thereof can be enhanced, and power consumption can be reduced.

The flow controller according to the present invention is not limited to the above-described embodiment, and it is a matter of course that various modified or additional structures could be adopted therein without deviating from

The invention claimed is:

1. A flow controller comprising:
 a body including a first passage disposed on an upstream side through which a fluid flows, a second passage disposed on a downstream side with respect to the first passage, and a throttling section disposed between the first passage and the second passage;
 a flow rate detector disposed on the body and which includes a detection unit configured to detect flow rate of the fluid that flows from the first passage to the second passage;
 a flow rate controller for controlling a flow rate of the fluid through the body and which is disposed in parallel with the flow rate detector, the flow rate controller including a diaphragm assembly which is displaced by supply of pilot air, a stem having a first end connected to the diaphragm assembly, a valve body fixed to a second end of the stem which opposes the first end such that the valve body is connected to the diaphragm assembly through the stem, and a spring that urges the valve body in a direction to be seated on a valve seat formed in the body,
 wherein the detection unit includes a MEMS sensor, the flow rate controller further comprising a balancing structure for balancing a first pressing force applied from the diaphragm assembly to the valve body with a second pressing force applied from the spring to the valve body and which opposes the first pressing force.

2. The flow controller according to claim 1, wherein the flow rate control unit further comprises a switching valve for switching a supply state of the pilot air, the switching valve being operated by a control signal output from a control unit, wherein the control signal is a PWM signal or a PFM signal.

3. The flow controller according to claim 2, wherein the switching valve comprises a supply valve that supplies the pilot air to a supply chamber formed between the diaphragm assembly and the body to operate the diaphragm assembly, and an exhaust valve that discharges the pilot air from the supply chamber to the exterior thereof to return the diaphragm assembly, the supply valve and the exhaust valve comprising two-way valves that are operated by the control signal.

4. The flow controller according to claim 3, wherein each of the supply valve and the exhaust valve comprises a two-way valve that is switched electrically by a control signal.

5. The flow controller according to claim 1, wherein an elastic force of the spring is applied to the valve body in a same direction as the flow direction of the fluid.

6. The flow controller according to claim 1, wherein the pilot air is supplied to the diaphragm assembly from an upstream side of the flow rate detector.

7. The flow controller according to claim 1, further comprising a flow rectifier for rectifying the flow of the fluid disposed in the first passage on an upstream side of the throttling section.

8. The flow controller according to claim 1, wherein the detection unit comprises a detection passage communicating between an upstream side and a downstream side of the throttling section thereby to bypass the first passage, and a detection sensor disposed to confront the detection passage.

9. The flow controller according to claim 1, wherein said spring is set with a small elastic force which provides an upward force which substantially matches a downward force provided by the diaphragm assembly.

\* \* \* \* \*